United States Patent
Zhang et al.

(10) Patent No.: US 7,684,405 B2
(45) Date of Patent: Mar. 23, 2010

(54) BROADBAND ACCESS METHOD WITH GREAT CAPACITY AND THE DEVICE AND THE SYSTEM THEREOF

(75) Inventors: Shifa Zhang, Shenzhen (CN); Haijun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 794 days.

(21) Appl. No.: 10/558,451

(22) PCT Filed: Mar. 1, 2004

(86) PCT No.: PCT/CN2004/000158

§ 371 (c)(1),
(2), (4) Date: Sep. 22, 2006

(87) PCT Pub. No.: WO2004/105319

PCT Pub. Date: Dec. 2, 2004

(65) Prior Publication Data

US 2007/0159971 A1    Jul. 12, 2007

(30) Foreign Application Priority Data

May 26, 2003    (CN) .................. 2003 1 0038390

(51) Int. Cl.
*H04L 12/28* (2006.01)
*G01R 31/08* (2006.01)
*H04J 3/24* (2006.01)
*H04L 12/56* (2006.01)

(52) U.S. Cl. .............. 370/395.2; 370/230; 370/349; 370/389; 370/392; 370/395.3; 370/395.5; 370/395.54; 370/474

(58) Field of Classification Search .............. None
See application file for complete search history.

(56) References Cited

U.S. PATENT DOCUMENTS 6,662,308 B1 * 12/2003 Baroni et al. .................. 714/4

7,006,472 B1 * 2/2006 Immonen et al. ............ 370/332

(Continued)

FOREIGN PATENT DOCUMENTS

| EP | 1 628 437 A1 | 2/2006 |
| WO | 0131843 A2 | 5/2001 |
| WO | WO 01/35240 A1 | 5/2001 |
| WO | WO 02/14977 A2 | 2/2002 |
| WO | WO 02/15478 A1 | 2/2002 |

OTHER PUBLICATIONS

Supplementary European Search Report from European Patent Application 04715868.
Tiebing Xie, et al. "A generic way for wireline and wireless access authentication" ICCT 2003. 2003 International Conference on Communication Technology. Proceedings (IEEE Cat. No. 03EX659) Beijing Univ. Posts & Telecommun. Press Beijing, China, vol. 1, Apr. 9, 2003, pp. 86-89 vol. 1, XP010643548 ISBN: 7-5635-0686-1.

(Continued)

*Primary Examiner*—Kwang B Yao
*Assistant Examiner*—Jutai Kao
(74) *Attorney, Agent, or Firm*—Conley Rose, P.C.; Grant Rodolph (57) ABSTRACT

The present invention discloses a high-capacity broadband access method, comprising: a broadband subscriber initiating an access request to an access unit; the access unit sending the subscriber authentication information to a control unit via a route switching unit; the control unit authenticating the subscriber with an internal or external authentication, authorization and accounting server, returning the authentication result to the access unit via the route switching unit, and sending the configuration information to the accessed subscriber; the route switching unit and the access unit accomplishing configuration of the subscriber information, allocating corresponding resource to the subscriber, and establishing a data channel for network access of the subscriber. The present invention also discloses a high-capacity broadband access device and a system thereof.

4 Claims, 8 Drawing Sheets

U.S. PATENT DOCUMENTS

| | | | |
|---|---|---|---|
| 2002/0167905 A1* | 11/2002 | Wenzel et al. | 370/249 |
| 2003/0039268 A1 | 2/2003 | Chong et al. | |
| 2003/0063659 A1 | 4/2003 | Kaltiainen et al. | |
| 2003/0231607 A1* | 12/2003 | Scanlon et al. | 370/338 |
| 2004/0208153 A1* | 10/2004 | Mizell et al. | 370/338 |
| 2005/0141442 A1* | 6/2005 | Morris et al. | 370/310 |
| 2005/0195787 A1* | 9/2005 | Madour et al. | 370/338 |
| 2006/0267936 A1* | 11/2006 | Hoerl et al. | 345/158 |
| 2008/0101291 A1* | 5/2008 | Jiang et al. | 370/331 |
| 2009/0022152 A1* | 1/2009 | Henry et al. | 370/389 |

OTHER PUBLICATIONS

Komisarczuk P. "IP access service provision for broadband customers" IEE Colluquium on Services Over the Internet-What Does Quality Cost? (Ref. No. 1999/099) IEE London, UK, Jun. 23, 1999, pp. 5-1, XP006501453.

Cleve Mickles "<draft-mickles-v6ops-isp-cases-03.txt> —Transition Scenarios for ISP Networks" IETF Draft, [Online] Jan. 2003, XP002391649 Retrieved from the Internet: URL:http://ietfreport.isoc.org/cgi-bin/id2pdf?fl=draft-mickles-v6ops-isp-cases-03.txt>[retrieved on Jul. 21, 2005] Abstract.

McCann P.J. et al. "An Internet infrastructure for cellular CDMA networks using mobile IP" IEEE Personal Communications IEEE Use, vol. 7, No. 4, Aug. 2000, pp. 26-32, XP000954657 ISSN: 1070-9916.

Chen Cisco J. Stewart Juniper E: "A Framework for Inter-Domain Route Aggregation" IETF Standard, Internet Engineering Task Force, IETF, CH, Feb. 1999, XP015008302 ISSN: 0000-0003.

Wikipedia: "Route Aggregation" Wikipedia, [Online] Jun. 17, 2006, XP002403021 Retrieved from the Internet: URL:http://en.wikipedia.org/wiki/Route_aggregation> [retrieved on Oct. 11, 2006].

Jong-Tae Park et al. "Web-based customer network management" Enterprise Networking Mini-Conference, 1997, ENM-97., In Conjunction with the ICC-97., First IEEE Montreal, Que., Canada Jun. 11-12, 1997, New York, NY, USA, IEEE, US, Jun. 11, 1997, pp. 160-169, XP010229426 ISBN: 0-7803-4112-0.

"SNMP Management—User Manual" SNMP Management User Manual Open NS}, vol. 1.1, Nov. 2000, XP002241113.

Huawei Technologies Co., Ltd, Supplementary Partial European Search Report, Aug. 10, 2006.

Cleve Mickles: "<draft-mickles-v6ops-isp-cases-03.txt>.—Transition Scenarios for ISP Networks" IETF Draft, [Online] Jan. 2003, XP002391649, Retrieved from the Internet: URL:http//ietfreport.isoc.org/cgi-bin/id2pdf?fl=draft-mickles-v6ops-isp-cases-03.txt>[retrieved on Jul. 21, 2006] Abstract, Section 6 and subsections.

Mccann P J et al: "An Internet infrastructure for cellular CDMA networks using mobile IP" IEEE Personal Communications IEEE USA, vol. 7, No. 4, Aug. 2000, pp. 26-32, XP000954657 ISSN: 1070-9916 Abstract, Authentication, Authorization and Accounting.

Tiebing Xie et al: "A generic way for wireline and wireless access authentication" ICCT 2003. 2003 International Conference on Communication Technology. Proceedings (IEEE Cat. No. 03EX659) Beijing Univ. Posts & Telecummun. Press Beijing, China, vol. 1, Apr. 9, 2003, pp. 86-89 vol. 1, XP010643548 ISBN: 7-5635-0686-1 Abstract, III implementation model.

Komisarczuk P: "IP access service provision for broadband customers" IEE Colloquium on Services Over the Internet-What Does Quality Cost? (Ref No. 1999/099) IEEE London, UK, Jun. 23, 1999, pp. 5-1, XP006501453 Abstract, The LAA solution.

Li Zheng, et al. "IP DSLAM and Its Development", Xidian University.

Gupta, Vivek A., et al., "A Generalized Model for Link Layer Triggers," IEEE 802.21, Mar. 1, 2004, pp. 1-11.

Foreign Communication From a Related Counterpart Application—International Search Report and Written Opinion, PCT/CN2004/000158, Jun. 10, 2004, 10 pages.

\* cited by examiner

BROADBAND ACCESS METHOD WITH GREAT CAPACITY AND THE DEVICE AND THE SYSTEM THEREOF

CROSS REFERENCE TO RELATED APPLICATIONS

This application is the U.S. national phase application of PCT Application No. PCT/CN2004/000158 filed Mar. 1, 2004 and entitled "Broadband Access Method With Great Capacity And The System Thereof," which claims priority to Chinese application No. 03138390.4, filed on May 26, 2003 with the State Intellectual Property Office of the People's Republic of China, entitled "Broadband Access Method with Great Capacity and the System Thereof".

FIELD OF THE INVENTION

The present invention relates to broadband network technology, in particular to a broadband access method and a device and a system thereof.

BACKGROUND OF THE INVENTION

A broadband access network system comprises subscriber access devices (DSLAMs or LAN SWs), a network aggregation device (ATM switch or Ethernet switch), a BAS (Broadband Access Server), and an authentication, authorization and accounting (AAA) server.

Figure 1:
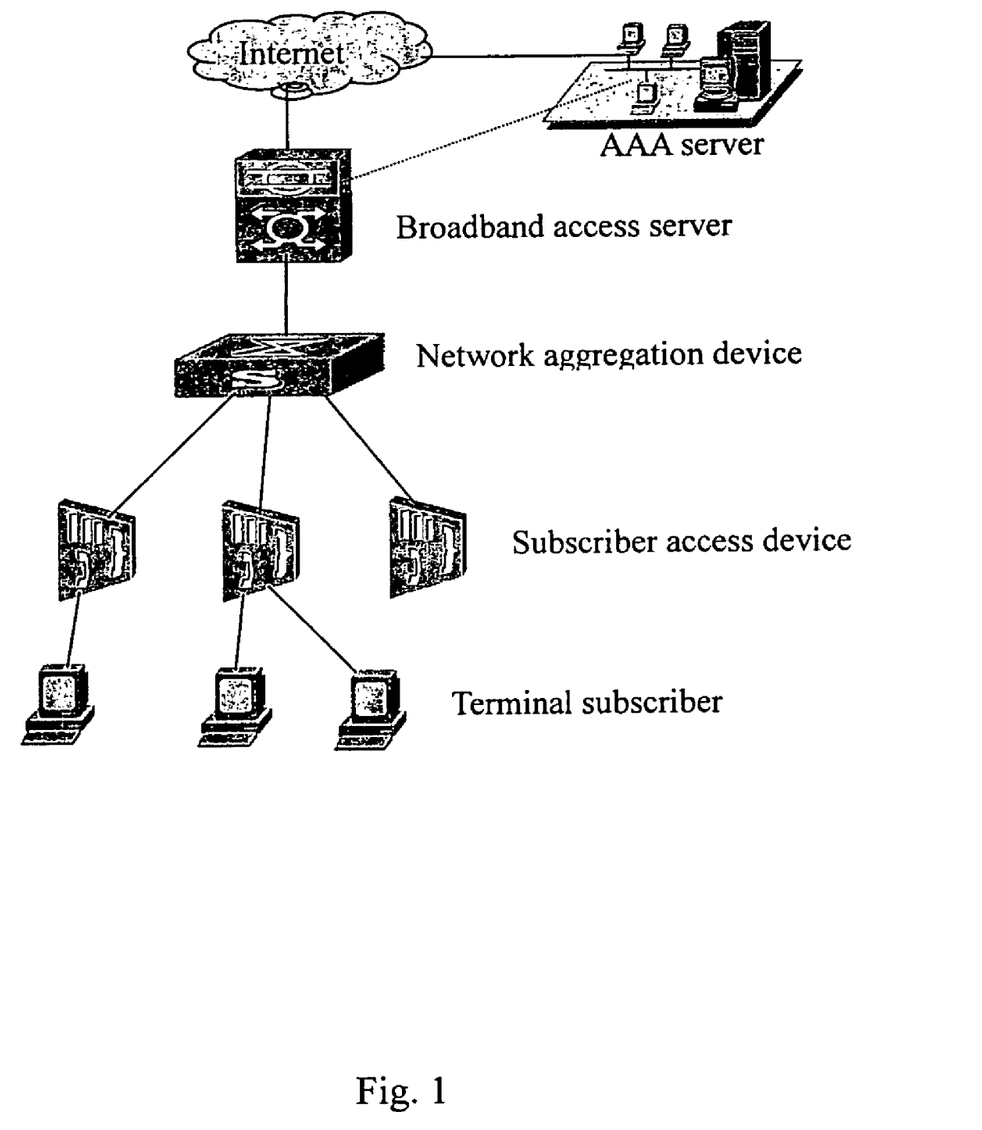
FIG. 1 is a schematic diagram of the network architecture in the prior art.

The network architecture of an existing broadband access network is shown in FIG. 1: the subscriber access devices support the subscriber lines aggregation function. The subscriber lines may be digital subscriber lines, Category 5 twisted-pairs, or optical fibers. Each subscriber access device can aggregate tens, hundreds, or thousands of subscriber lines and forward data messages from subscribers to one or a plurality of uplinks. The subscriber access devices can forward data messages from uplinks to the subscribers. The subscriber access devices typically work in L2 mode, i.e., it only processes link layer information in the data messages and forwards the messages according to the address information on the link layer. In order to ensure the security and QoS of subscriber access, the subscriber access devices usually assign a separate virtual channel on the link layer to each subscriber. In general, subscriber access devices include DSLAM devices, Ethernet switches, and wireless LAN access point devices, etc.

The network aggregation device connects the subscriber access devices to the broadband access server. The network aggregation device also works in L2 mode, i.e., it only processes link layer information in the data messages and forwards the messages according to the address information on the link layer. Since the network aggregation device has to support aggregation of many broadband subscribers, it is difficult to assign a separate virtual channel on the link layer to each subscriber; instead, it can assign a separate virtual channel on the link layer to each subscriber access device. In general, network aggregation devices include ATM switch and Ethernet switch, etc.

The broadband access server terminates the subscribers accessing link layer, i.e., it receives user ID and password, and sends them to the AAA server for authentication; if the authentication is passed successfully, the broadband access server authorizes the subscriber for Internet access. During the subscriber uses Internet, the broadband access server performs metering for the network use (duration or traffic), creates essential accounting data, and sends the data to the AAA server. The link layer protocols terminated by the broadband access server include Ethernet, ATM, and PPP protocols, etc. The broadband access server also achieves security control of subscriber's accessing network and provision of value-added services.

The AAA server stores and manages subscriber's account number and password information; during the authentication of a subscriber, it receives the subscriber's account number and password from the broadband access server, verifies them, and provide the subscriber with an authority according to the subscriber's access authority state. During the subscriber's accessing of the network, the AAA server collects the essential accounting data from the broadband access server, calculates access charge for the subscriber, and records the accounting data.

In the system shown in FIG. 1, access, aggregation, and authentication management of subscribers are implemented in three different types of devices. The three types of devices are independent to each other. During service distribution, not only the subscriber information has to be configured on the AAA server, but also subscribers-related link information is required to be configured on the three types of devices. Since all traffic of subscribers have to flow through the broadband access server, and the broadband access server has to provide duplication function for each broadband multicasting subscriber when the multicast is provided for the subscriber, thus the broadband access server will become a bottleneck of multicasting traffic.

In the existing solution of broadband access of network, the access devices are low-capacity subscriber access devices; usually, such a subscriber access device can provide accesses for tens of to hundreds of subscribers. Though the subscriber access capacity can be increased to thousands of subscribers through cascading a plurality of subscriber access devices, it is difficult to further increase the number of subscribers.

Due to the low capacity of subscriber access devices, the aggregation device has to be utilized to aggregate the subscriber access devices and then connect them to the broadband access server. In this case, the broadband access server resides on a higher network layer and manages more subscribers, resulting in the following problems: 1. the broadband access server becomes a single point of failure and a performance bottleneck; 2. the access and aggregation layers have weak control capability, the network performance is affected by the broadcasting traffic of the subscribers on the access layer, and the access layer has weak ability on anti-attacks from illegal accessed subscribers; 3. since the subscriber link layer is terminated centrally, especially in case that PPPoE protocol is used, the copy of multicasting traffic has to be accomplished at the broadband access server, resulting in a traffic bottleneck and bringing difficulty to provision of the multicasting service.

To overcome the above disadvantages, the prior art has employed a way of implementing broadband access server function at subscriber access devices. That is to say, the following functions are implemented on the access devices at the network edge: termination of the subscriber accessed link layer, authentication of subscribers, and authorization of subscriber's accessing Internet. In this way, access control of subscribers is implemented at the network edge, and thereby the performance bottleneck and single point of failure problems of central broadband access servers are overcome. Since the control of subscribers is performed at the network edge, the security of network access layer is ensured, and the broadcasting traffic from subscribers is filtered at the network edge, thereby the capacity of the access layer is increased; since the termination of subscribers is accomplished at the network edge, the problem of performance bottleneck of multicasting service is not present. However, the technical solution still has the following disadvantages:

1. difficulty in IP address planning: there are numerous subscriber access devices and each access device has to be allocated with a IP address pool separately; there are too many routes in the network due to the excessively allocated IP address pools, and therefore it is unable to enable a plurality of access devices to share the same IP address pool, resulting in waste of address resource due to unbalance address allocation. In the case of insufficient address resource, especially when the number of addresses is less than the total number of subscribers but is more than the number of concurrent access subscribers and the growth of number of concurrent access subscribers connected to each access device is unpredictable, it is difficult to plan addresses among the access devices, and thereby the situation of unavailable subscriber access often occurs locally due to insufficient addresses.

2. Difficulty in central management and reduction of operation and maintenance cost, heavy maintenance work;

3. Difficulty in cost reduction due to complicated devices on the access layer;

4. Insufficient support to value-added services due to simple access devices.

SUMMARY OF THE INVENTION

An object of the present invention is to provide a high-capacity broadband access method and a device and a system thereof, in order to solve the problems of difficulties in IP address planning and central management in the prior art.

The technical solution of the present invention is:

a high-capacity broadband access method, comprising the following steps of:

A. a broadband subscriber initiating an access request to an access unit;

B. the access unit sending the subscriber authentication information to a control unit via a route switching unit;

C. the control unit authenticating the subscriber with an internal or external authentication, authorization and accounting server, returning the authentication result to the access unit via the route switching unit, and sending the configuration information to the accessed subscriber;

D. the route switching unit and the access unit accomplishing configuration of the subscriber information, allocating corresponding resource to the subscriber, and establishing a data channel for network access of the subscriber.

Wherein step B further comprises the following steps of:

the access unit establishing a link between itself and the subscriber;

the access unit receiving the authentication request message from the subscriber and obtaining the subscriber authentication information from the request message;

sending the subscriber authentication information to the control unit via the route switching unit.

A high-capacity broadband access device, comprising:

an access unit, designed to aggregate terminal subscribers, in order to process and forward data messages from subscribers, and to process data messages sent from the network and forward to the terminal subscribers;

a route switching unit with a network interface for network access, which is connected with the access unit and designed to forward messages according to the destination addresses of the received data messages;

a control unit, connected with the route switching unit, and designed to control the route switching unit and the access unit and authenticate the terminal subscribers.

Wherein said control unit comprises:

an AAA server, designed to perform authentication, authorization and accounting on the subscribers;

a communication interface module, designed to connect the route switching unit;

a management module, connected with the AAA server and the communication interface module, designed to control the AAA server in authentication, authorization and accounting, and intercommunicate with the route switching unit via the communication interface module;

a console interface module, connected with the management module, in order to intercommunicate with the console via the console interface module under control of the management module.

Said access unit comprises:

a control and management module, designed to control and manage each module of the access device;

a subscriber line interface/modem module, connected with the control and management module through a control channel, designed to provide a service interface for subscribers and implement modulation and demodulation on the physical layer;

a subscriber link layer protocol adapting module, connected with the control and management module through a control channel and connected with the subscriber line interface/modem module through a data channel;

a L3 processing module, connected with the control and management module through a control channel and connected with the subscriber link layer protocol adapting module through a data channel;

a network side protocol adapting module, connected with the control and management module through a control channel and connected with the L3 processing module through a data channel.

A high-capacity broadband access system, comprising a network, a terminal subscriber, and a subscriber access device connecting the subscriber with the network, wherein said subscriber access device comprises a control unit, a route switching unit, and an access unit; said route switching unit connects the access unit with the network; said access unit is connected with the terminal subscriber; said control unit is connected with said route switching unit and manages and controls said route switching unit and said access unit and accomplishes authentication of the terminal subscriber for access.

The present invention solves the problem of IP address sharing among a plurality of DSLAMs and reduces the difficulty in address planning and operation and maintenance cost. The central management facilitates provision of new services, upgrade of services, attraction of more subscribers, and increase of operation cost; in addition, the central management also simplifies operation and maintenance, reduces requirements of operators and operation and maintenance cost. By centralizing the high-capacity route switching and termination of distributed subscriber link layer as well as improving switching capacity and service processing capability of the system, the present invention can meet the increasing requirements of broadband subscribers for bandwidth and performance. By using the structure with units, the present invention optimizes function distribution among units and simplifies the function of each unit as well as reduces the cost of device without reducing the function of device. The device provided in the present invention can facilitate provision of multicasting service.

DETAILED DESCRIPTION OF THE EMBODIMENTS

Figure 2:
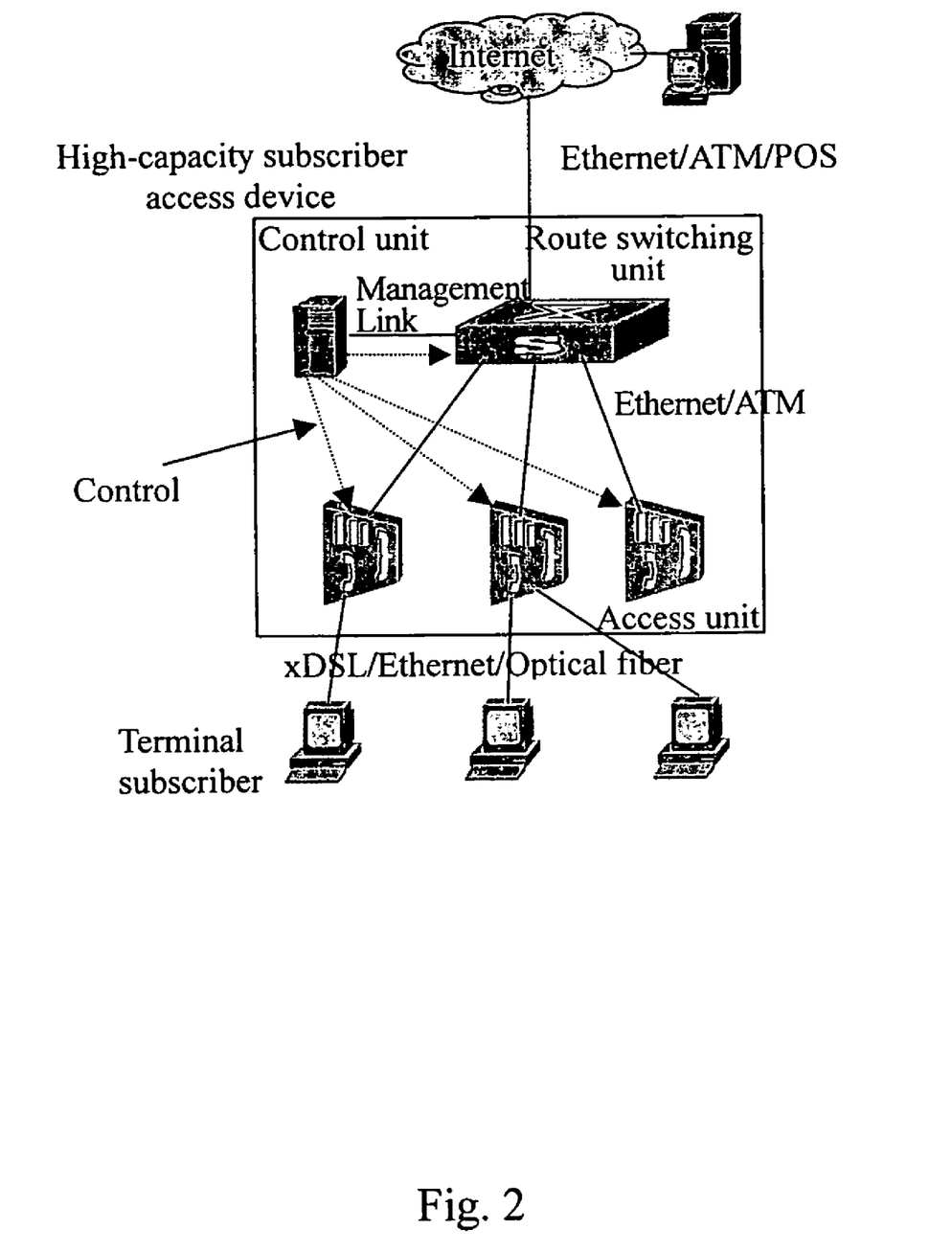
FIG. 2 and FIG. 3 are schematic diagrams of the network architecture of the high-capacity subscriber access device in the present invention.

As shown in FIG. 2, terminal subscribers access Internet via a high-capacity subscriber access device. The high-capacity subscriber access device comprises a control unit, a route switching unit, and access units (wherein, the dotted lines between the control unit and the route switching unit indicates the control relation).

The control unit is connected to the routing switching unit usually via an Ethernet interface, or can be connected to the system via the internal bus of the route switching unit or the access unit. In case that the internal bus connection solution is used, the control unit will act as a card of the route switching unit or the access unit, or be integrated with the control module of the route switching unit and/or the access unit. The route switching unit can be connected to the access unit via an Ethernet interface (FE/GE) or an ATM interface, or a RPR interface.

Figure 4:
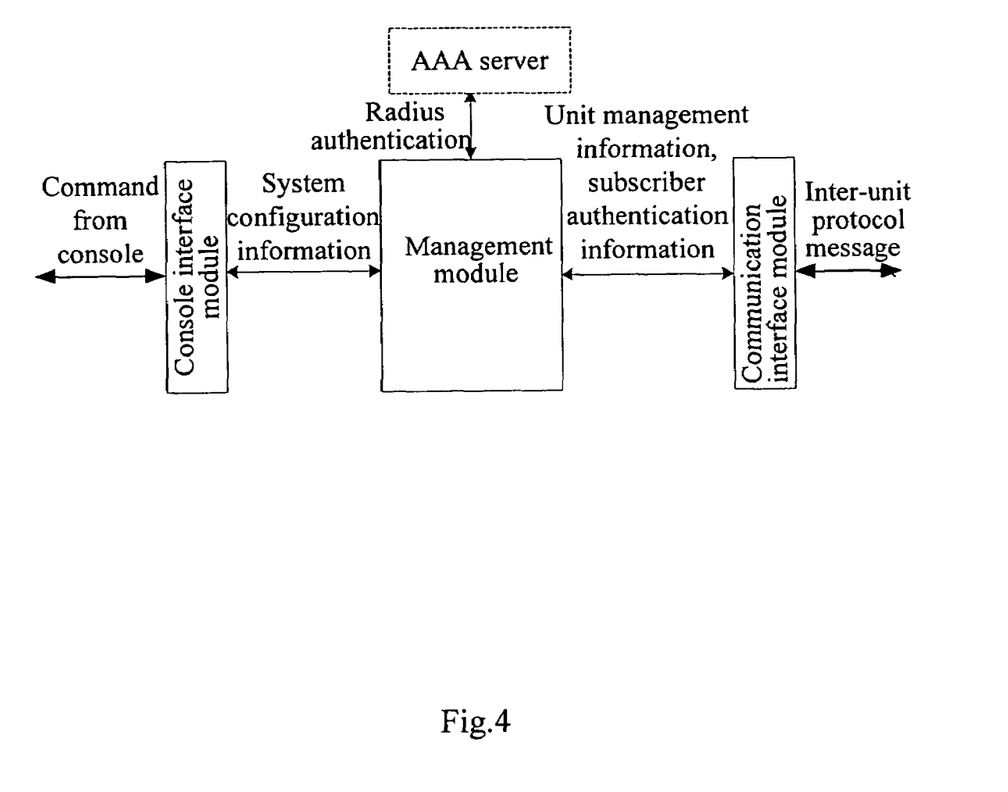
FIG. 4 is a schematic diagram of structure of the control unit.

Referring to FIG. 4, the control unit comprises a management module, an AAA server, a communication interface module and a console interface module which are connected with the management module respectively.

The AAA server performs authentication, authorization and accounting for subscribers; the communication interface module is designed to connect the route switching unit to intercommunicate with the management module; the console interface module is designed to connect the console (not shown). The management module controls the AAA server in authentication, authorization, and accounting, communicates with the route switching unit via the communication interface module, and receives commands from the console via the console interface module to obtain system configuration information. The AAA server may operate as a part of the control unit or an independent device.

When a subscriber passes the authentication successfully, the control unit, the route switching unit, and the access unit accomplish subscriber-related resource allocation and parameter setting. Each unit collects network traffic and access duration information of the subscriber, so that the access unit or control unit creates a charging bill and send it to the AAA server for accounting.

Figure 5:
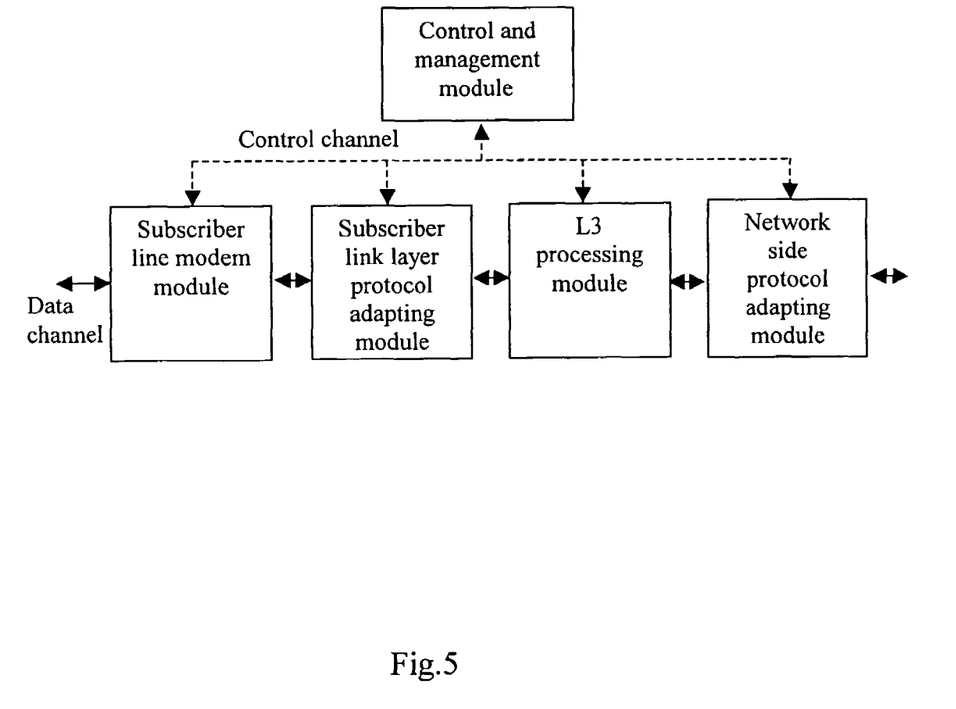
FIG. 5 is a schematic diagram of structure of the access unit.

Referring to FIG. 5, the access unit comprises a control and management module, a subscriber line modem module, a subscriber link layer protocol adapting module, a L3 processing module, and a network side protocol adapting module.

The control and management module is implemented to manage and control the modules in the access unit, to receive and process authentication requests from subscribers, and to communicate with the control unit to accomplish the authentication.

The subscriber line modem module is connected with the control and management module through a control channel, and is designed to provide a service interface for subscribers and to implement modulation and demodulation on the physical layer.

The subscriber link layer protocol adapting module is connected with the control and management module through a control channel and connected with the subscriber line modem module through a data channel, and is designed to process the subscriber link layer protocols under control of the control and management module.

The L3 processing module is connected with the control and management module through a control channel and connected with the subscriber link layer protocol adapting module through a data channel, and is designed to forward subscriber messages.

The network side protocol adapting module is connected with the control and management module through a control channel and connected with the L3 processing module through a data channel, and is designed to accomplish encapsulation and de-capsulation of network side protocols.

The control unit provides central control of the device. The control unit implements central control of the route switching unit and the access unit through an inter-unit protocol (e.g., cluster management of device, routing protocol, dynamic host configuration protocol, or address translation protocol). The control unit also implements central allocation and management of IP addresses. The control unit implements service management function of the device. The control unit may manage the route switching unit and the access unit in direct management mode or proxy management mode. In direct management mode, the management unit manages all units in the device directly, and all other units and the structural relationship between them are invisible to the user. The direct management mode can enhance device integrity and simplify subscriber use. In proxy management mode, the management unit doesn't manage details of other units; instead, it forwards management commands to other units in proxy manner. With the proxy management mode, the subscriber has to be familiar with the system architecture of the device. An advantage is that the device is more flexible and has more powerful function. The control unit can be substituted by a route switching unit or an access unit in the device.

Figure 8:
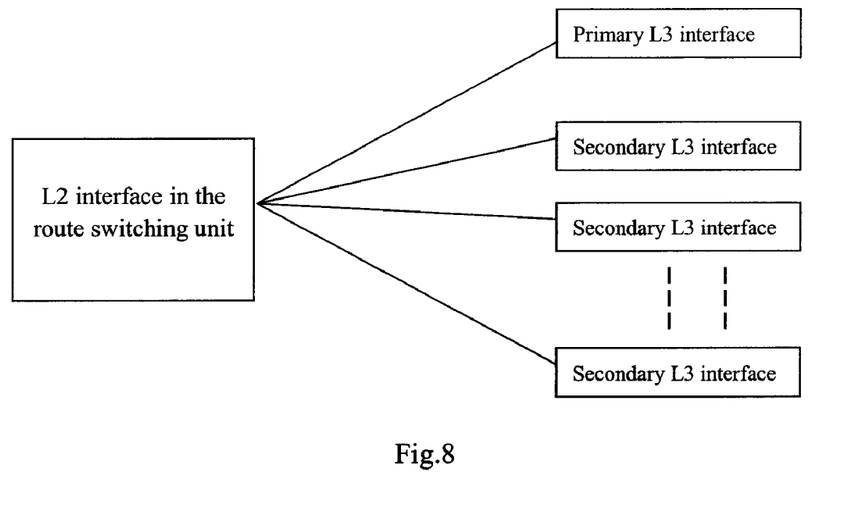
FIG. 8 is a schematic diagram of an access unit sharing the same group of address pools in the route switching unit with other access units.

The route switching unit implements broadband interconnection and switching among the units in the device and provides a network uplink interface. The route switching unit enables a plurality of access units to share the same group of address pools and implements route aggregation, so as to overcome difficulty in address planning and the problem of fragmented address segments. The route switching unit may be a L3 switch, router, or any other L3 route switching device.

The online authentication of all subscribers should be processed by the control unit, which acts as a role of Remote Authentication Dial In User Service (abbreviated as "Radius") server or Radius proxy. Therefore, the control unit can implement central allocation and management of IP addresses. As each address pool corresponds to an IP subnet as specified in IP protocol, a plurality of access units can share the same address pool as long as the interfaces of the route switching unit connected to different access units are configured under a L3 interface.

In addition, on the basis of a standard L3 switching device, the route switching unit can implement the function that each L2 interface belongs to a plurality of L3 interfaces. That is to say, a primary L3 interface and a plurality of secondary L3 interfaces can be configured on each L2 interface, so that the hosts in different L3 subnets can be connected to the same L2 interface in the same route switching unit. In the high-capacity broadband access device, an access unit connected to a certain L2 interface of the route switching unit can allocate IP addresses from a plurality of L3 subnets to the subscribers. The principle of address allocation is: the addresses in the address pool corresponding to the primary L3 interface are allocated first, and then the addresses in the address pool corresponding to the secondary L3 interfaces are allocated. Whenever the control unit allocates an address, it notifies the route switching unit to configure the address translation table and L2 address table corresponding to the address through internal protocol, so as to enable simplify the route switching unit to resolve the mapping relation between L3 and L2 addresses dynamically, and reduce additional system overhead on dynamic L2 address learning.

The principle of implementing primary/secondary L3 interfaces:

configuration: The control unit can establish several L3 interfaces according to the situation of the address pool; these L3 interfaces have no binding relationship with the physical L2 interfaces, and they are organized into several composite L3 interfaces, each of which has a primary L3 interface and several secondary L3 interfaces; address pool re-planning can be accomplished through adding/reducing secondary L3 interfaces to/from each composite L3 interface due to configuration; each physical L2 interface is assigned with a composite L3 interface.

Uplink forwarding: the address resolution messages (a sort of broadcasting message) should be processed first; there are two types of address resolution messages from the access unit: one type is designed to resolve the gateway address; the other type is designed to resolve the address of another subscriber. If it is requested to resolve the gateway address, the device responds with the L2 address of the route switching unit; if it is requested to resolve the address of another subscriber, the device checks whether the subscriber whose address is resolved is online; if the subscriber is online, the device will respond with the L2 address of the route switching unit; if the subscriber whose address is resolved is not online, the device will not provide any response. This is the function of address resolution proxy. After address resolution, the uplink message is forwarded on L2 to the route switching unit via the access unit, then forwarded on L3 via the route switching unit; at the same time, the route switching unit forwards the message via the primary L3 interface of the source L2 interface.

Downlink forwarding: since the subscriber's L3 address and L2 address information has been configured in the corresponding tables in the route switching unit during the subscriber online authentication process, the dynamic downlink address resolution process can be omitted. When the destination port of the downlink message is determined through the L3 forwarding, the downlink message is forwarded through the normal L3 forwarding process.

Route aggregation function: the route switching unit aggregates the address pools with consecutive addresses; therefore, only the aggregated address segments can be seen from the network side. Here, the route switching unit has the function of route aggregation, which has a significance to reduce the number of routes in a broadband network.

The access unit provides the function of access multiplexing of digital subscriber lines, category 5 twisted-pairs, or optical fibers. It implements termination of subscriber link layer, the link layer including Ethernet, ATM, and PPP protocols, etc.); after termination of the link layer, subscriber messages on the network layer (IP packets) are encapsulated on the link layer at network side and then sent to the route switching unit. After termination of the subscriber link layer, control functions of subscriber authentication, accounting, and service (e.g., multicasting) can be implemented inside the access unit or implemented with the assistance of the control unit. The access unit can be used as a subscriber access device independently.

Figure 3:
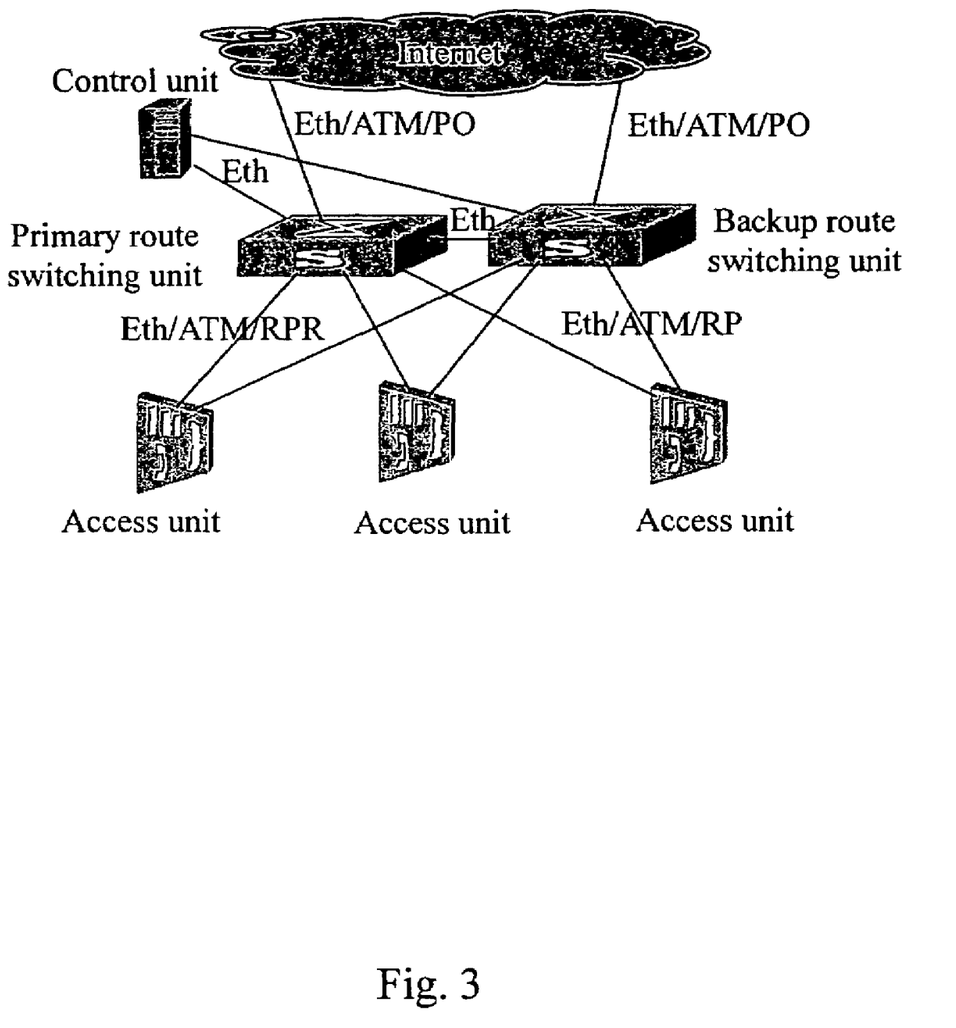

Referring to FIG. 3, the route switching unit is the physical link connection center of the entire device and holds the key position, thus two route switching units can be configured, so that they can work simultaneously to implement load sharing and backup; this can not only improve the capacity of system but also avoid the single point of failure and enhance the reliability of system. The access units are connected to the two route switching units in dual homing mode, and the control unit is connected to the two route switching units simultaneously in dual homing mode; the network-side interfaces are provided by the two route switching units, which are interconnected to each other via a 1000 M Ethernet. Such a mode implements 1:1 load sharing and backup between the route switching units.

The route switching units are usually connected with the control unit directly; an access units can be connected to the route switching units, or connected to another access unit in the system in cascaded mode.

The control unit is the management and control center of the entire device; the control unit implements, through inter-unit protocols, functions including login of units, monitoring and control of states of units, and query of configuration of units, etc.

Referring to the login part in FIG. 6, the login process of an access unit (i.e., protocol implementation) is as follows:

(1) a route switching unit or the access unit is connected to the system via a network link (Ethernet, ATM or RPR).

(2) The access unit/route switching unit sends a broadcasting message of login request to the system; said broadcasting message reaches the control unit directly or via the route switching unit.

(3) After receiving the login request message from the access unit/route switching unit, the control unit verifies version compatibility the control unit/route switching unit and checks ID of the unit, to ensure legality and security of the unit.

(4) After the successful authentication, the control unit notifies the access unit/route switching unit that the login is successful, and sends corresponding configuration information including management information and service management information, wherein the management information includes internal code of the unit, monitoring mode, and monitoring and response period, etc., and the service management information includes address of the Radius server, Radius protocol parameters, and accounting parameters, etc.

(5) Before logging out from the system, the access unit/route switching unit may send a logout message; after receiving the logout message, the control unit updates the state of the access unit/route switching unit.

The login process of the route switching unit is similar to that of the access unit.

Figure 6:
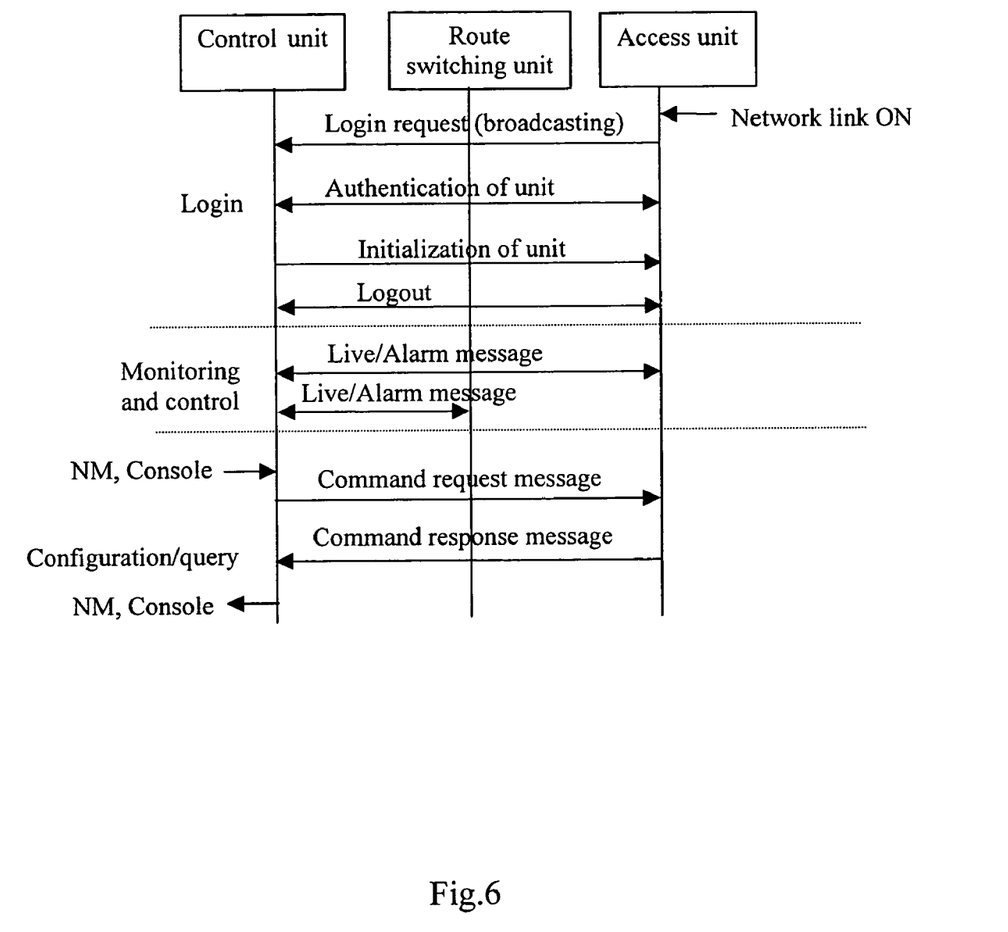
FIG. 6 is a flow diagram of login of the route switching unit and the access unit to the control unit.

Referring to the monitoring and control part in FIG. 6, when the access unit/route switching unit finishes the login, LIVE state messages are sent between the access unit/route switching unit and the control unit periodically. In case there is any abnormality in the unit, it will send an ALARM message to the control unit immediately. Through the LIVE and ALARM messages, the control unit can monitor and control the state of each unit in the system in real time.

Referring to the configuration/query part in FIG. 6, the principle of configuration/query of the access unit by the control unit is as follows: when receiving a configuration/query message from the network manager or console, the control unit knows the destination access unit of the message by analyzing the message, and sends a command request message to the corresponding access unit through the internal protocol. When receiving the command request message, the access unit analyzes and processes the command, and returns the processing result to the control module through a command response message; then the control module returns the response result to the network manager or console. The configuration/polling of the route switching unit is similar to this.

The subscriber access process comprises the following procedures: the subscriber online authentication, the subscriber data forwarding, and the subscriber offline.

The subscriber online authentication may be performed in different ways, such as PPPoE, 802.1x, Vlan+WEB, etc.

Figure 7:
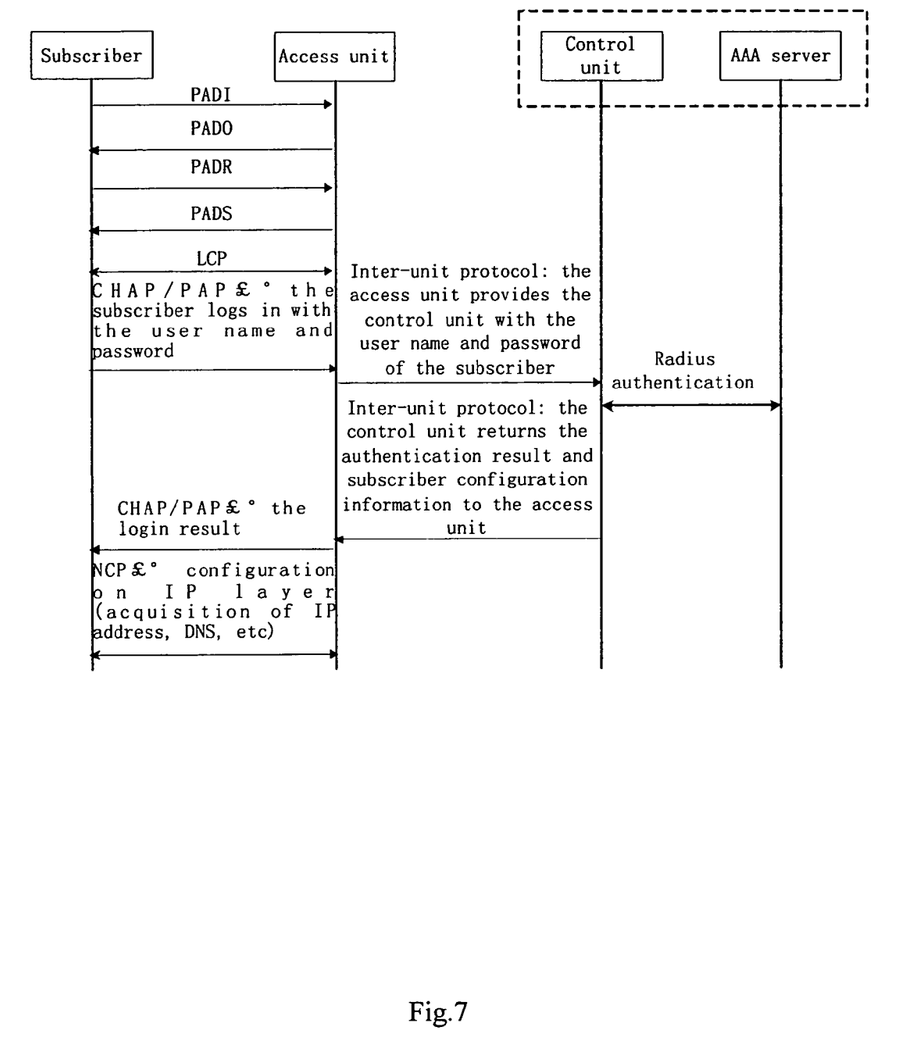
FIG. 7 is a flow diagram of authenticating subscribers by the control unit.

Referring to FIG. 7, the subscriber online authentication process in the case of PPPoE [Reference RFC2516] approach will be described; the processes of other authentication approaches are similar to this.

The main steps include:

(1) the access unit establishing a link to the subscriber;

(2) the access unit receiving an authentication message (containing authentication information of the subscriber, e.g., user name and password, etc.) from the subscriber, and passing the message to the control unit to process through an inter-unit protocol;

(3) the control unit accomplishing the Radius authentication of the subscriber and obtaining configuration information of the subscriber, e.g., IP address to be allocated to the subscriber, DNS server for the subscriber, and OoS of the subscriber, etc;

(4) the control unit returning the authentication result (whether the user name and password are correct) and the configuration information of the subscriber to the access unit;

a. sending the authentication result (whether the user name and password are correct) and the configuration information of the subscriber (the IP address allocated to the subscriber, traffic parameters, etc) to the access unit, to establish, on the access unit, a subscriber access channel, i.e., the corresponding relationship between subscriber information, which includes port for the subscriber, IP address of the subscriber, link layer encapsulation for the subscriber, traffic parameters of the subscriber;

b. sending the configuration information of the subscriber (IP address of the subscriber, corresponding port of the route switching unit, and traffic parameters, etc) to the route switching unit, to establish a subscriber access channel on the route switching unit;

(5) the access unit responding to authentication of the subscriber and accomplishing configuration of the subscriber.

For an accessed subscriber, the data forwarding is performed in both uplink and downlink directions, the uplink meaning from the subscriber to Internet and the downlink meaning from Internet to the subscriber.

Uplink Flow:

When receiving a data message from the subscriber, the access unit checks validation of the message, e.g., whether the protocol encapsulation is correct, whether the message is sent from the authenticated subscriber, etc, and discards the message if the message is invalid;

for a valid message, the access device removes the encapsulation of point-to-point protocol, ATM protocol or other subscriber side link layer protocols from the data message as required, to obtain an internal message of the subscriber;

when the link layer protocol encapsulation is removed, the access unit performs a link layer protocol encapsulation at the access network side on the network layer message of the subscriber (IP packet), and then sends to the route switching unit;

the access unit performs a link layer protocol encapsulation at the access network side on the internal message of the subscriber, and sends the encapsulated data packet to the route switching unit;

the route switching unit accomplishes a route switching for the data packet and removes the access network side encapsulation from the data packet; if the destination address of the data packet is at the network side, the route switching unit performs a link layer encapsulation at the network side and sends the data packet to the network; if the destination address of the data packet is at the subscriber side, the route switching unit performs a link layer encapsulation at the access network side and sends the encapsulated data message to the corresponding access unit.

Downlink Flow:

when receiving a data packet from Internet, the route switching unit accomplishes a route looking up, to determine the access unit, to which the data packet is sent;

the route switching unit removes the link layer encapsulation at the network side from the data packet, performs a link layer encapsulation at the access network side, and then sends the encapsulated data message to the corresponding access unit;

the access unit searches in the subscriber information according to the destination address of the data packet, to determine the destination subscriber of the data packet;

the access unit removes the link layer encapsulation at the access network side from the data packet, performs a link layer encapsulation at the subscriber side, and then sends to the destination subscriber.

Subscriber offline approach may be: the subscriber gets offline positively, the subscriber drops due to abnormality, or the subscriber is forced offline.

The subscriber gets offline positively: it is similar to the subscriber online process, and is initiated positively by the subscriber. When a subscriber wants to get offline, he/she can terminate the connection and stop the access by sending an offline request message through the client software, for example, in the case of PPPoE authentication, the subscriber may send a LCP-Terminate-Request message on LCP protocol or a PADT message on PPPoE protocol. When receiving the offline request, the access unit passes the corresponding subscriber information to the control unit for processing; the control unit (and the AAA server) accomplishes an offline processing (e.g., release of IP address); then the access unit responds to the offline request from the subscriber correctly and releases the resource occupied by the subscriber.

The subscriber drops due to abnormality: Though the subscriber doesn't get offline positively, the access unit (or the control unit) detects a subscriber link failure or abnormal subscriber state (e.g., system halt). In this case, the control unit (and the AAA server) accomplishes an offline processing, and the access unit releases the resource occupied by the subscriber.

The subscriber is forced offline: during the process of subscriber access, it is required to terminate the subscriber access due to a certain reason (e.g., the deposit is used up). In this case, the control unit (and the AAA server) accomplishes an offline processing, and the access unit releases the resource occupied by the subscriber.

Another embodiment of the present invention relates to a high-capacity broadband access system, comprising a network, a terminal subscriber, and a subscriber access device connecting the subscriber with the network, wherein said subscriber access device comprises a control unit, a route switching unit, and an access unit; said route switching unit connects the access unit with the network; said access unit is connected with the terminal subscriber; said control unit is connected with said route switching unit and manages and controls said route switching unit and said access unit and accomplishes authentication of the terminal subscriber for access.

The present invention provides a solution of high-capacity broadband subscriber access device, which can supports more than 4,000 broadband subscribers. Different from common low-capacity broadband subscriber access devices with authentication and accounting capability, the present invention employs a central route switching unit and a central control unit. A common access device can't meet the demand of a large amount of subscribers for access bandwidth and doesn't support a larger number of access units due to its low switching capacity and a small number of cascaded interfaces. With the route switching unit, the present invention can connect a large number of access modules simultaneously, to increase the number of accessed subscribers and improve the subscriber bandwidth. With an independent route switching unit, the present invention can also implement 1:1 route sharing and backup of the core unit, and thereby improves the system reliability and meets the requirements for reliability when there are a large number of accessed subscribers. The control module of a common access device can only meet the requirements of control and processing of a single access module or a few of cascaded modules, and thereby is unable to control the access of a large amount of subscribers.

The present invention implements central management and distributed termination simultaneously: 1. the present invention implements central management and route aggregation with the control unit and route switching unit, and implements central management in the application of device, and implements reduced amount of routes in the network through the route aggregation, which facilitate operation and management and reduction of operation cost; 2. the problem of performance bottleneck of central termination of link layer is overcome through termination of subscriber link layer in the access unit, which is one of the reasons for implementing high-capacity access of the present invention.

The invention claimed is:

1. A broadband network access method, comprising the following steps:
    an access unit checking validity of an access request received from a subscriber;
    for a valid request, removing encapsulation of point-to-point protocol, ATM protocol or other subscriber side link layer protocols from the access request as required, to obtain authentication information of the subscriber;
    performing a link layer encapsulation at the access network side on the authentication information of the subscriber; and
    sending the encapsulated authentication information of the subscriber to a control unit via a route switching unit;
    the control unit controlling an internal or external authentication, authorization and accounting server in authentication of the subscriber; after the authentication is passed, obtaining subscriber configuration information comprising an IP address allocated by the control unit to the subscriber, and sending authentication result and the subscriber configuration information to the access unit via the route switching unit;
    the route switching unit and the access unit, according to the subscriber configuration information comprising the IP address, allocating corresponding resource to the subscriber, and establishing a data channel for network access of the subscriber; and
    the control unit managing the route switching unit and the access unit in direct management mode or proxy management mode, wherein in direct management mode, the control unit manages the route switching unit and the access unit directly, and the route switching unit, the access unit and the structural relationship between them are invisible to the user, and in proxy management mode, the control unit does not manage the details of the route switching unit and the access unit, but only forwards management commands to them in proxy manner.

2. The method according to claim 1, wherein the access unit shares the same group of address pools in the route switching unit with other access units; and
    wherein a primary Layer 3 (L3) interface and a plurality of secondary L3 interfaces are configured on each L2 interface in the route switching unit; during route allocation, the addresses in the address pool corresponding to the primary L3 interface are allocated first, and then the addresses in the address pool corresponding to the secondary L3 interfaces are allocated.

3. A broadband network access system, comprising:
    at least one access unit, a route switching unit, and a control unit, wherein
    the at least one access unit is configured to check validity of an access request received from a subscriber; for a valid request, remove encapsulation of point-to-point protocol, ATM protocol or other subscriber side link layer protocols from the access request as required, to obtain authentication information of the subscriber; to perform a link layer protocol encapsulation at the access network side on the authentication information of the subscriber; and send the encapsulated authentication information of the subscriber to the control unit via the route switching unit;
    the control unit is configured to control an internal or external authentication, authorization and accounting server in authentication of the subscriber; after the authentication is passed, obtaining subscriber configuration information comprising IP address allocated by the control unit to the subscriber, and sending, authentication result and the subscriber configuration information, to the access unit via the route switching unit, authentication result and the configuration information of the subscriber, according to which, the route switching unit and the access unit allocate corresponding resource to the subscriber and establish a data channel for network access of the subscriber; and
    the control unit is further configured to manage the route switching unit and the access unit in direct management mode or proxy management mode, wherein in direct management mode, the control unit manages the route switching unit and the access unit directly, and the route switching unit, the access unit and the structural relationship between them are invisible to the user, and in proxy management mode, the control unit does not manage the details of the route switching unit and the access unit, but only forwards management commands to them in proxy manner.

4. The broadband network access system according to claim 3, wherein said access unit comprises:

a control and management module, designed to control and manage each module of the access device;

a subscriber line modem module, connected with the control and management module through a control channel, designed to provide a service interface for subscribers and implement modulation and demodulation on the physical layer;

a subscriber link layer protocol adapting module, connected with the control and management module through a control channel and connected with the subscriber line interface/modem module through a data channel, and is designed to process the subscriber link layer protocols under control of the control and management module;

a Layer 3 (L3) processing module, connected with the control and management module through a control channel and connected with the subscriber link layer protocol adapting module through a data channel, and is designed to forward subscriber messages; and a network side protocol adapting module, connected with the control and management module through a control channel and connected with the L3 processing module through a data channel, and is designed to accomplish encapsulation and de-capsulation of network side protocols.

* * * * *